Aug. 25, 1942.    C. F. KETTERING    2,294,036
REFRIGERATING APPARATUS
Filed Dec. 29, 1938    5 Sheets-Sheet 1
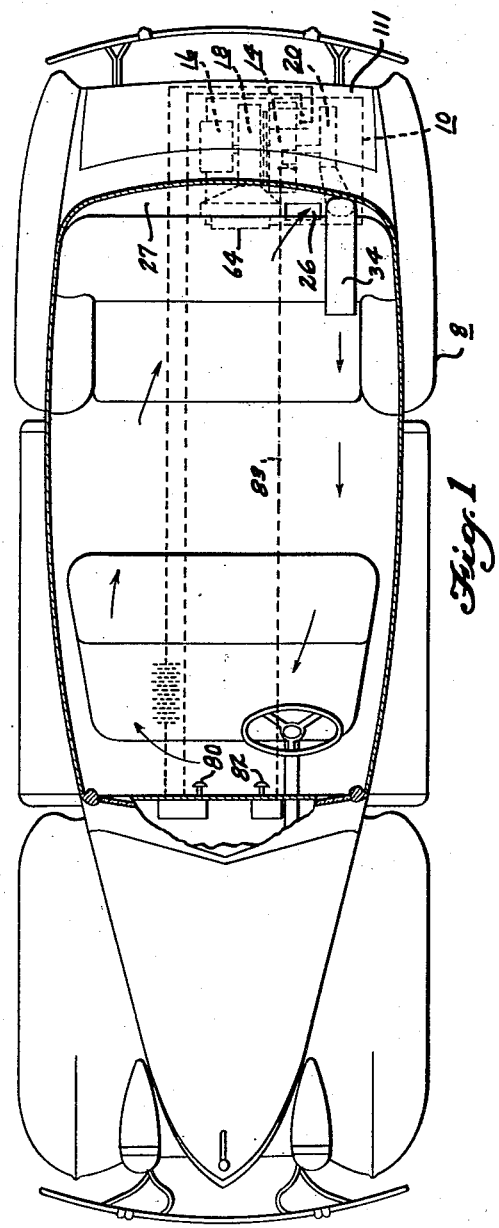
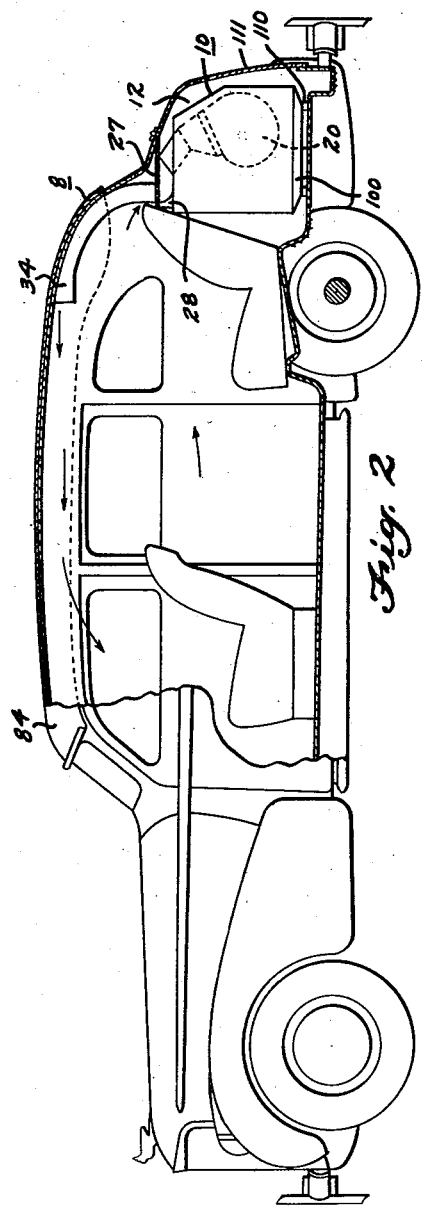
INVENTOR.
Charles F. Kettering.
BY Spencer, Hardman & Fehr.
ATTORNEYS.

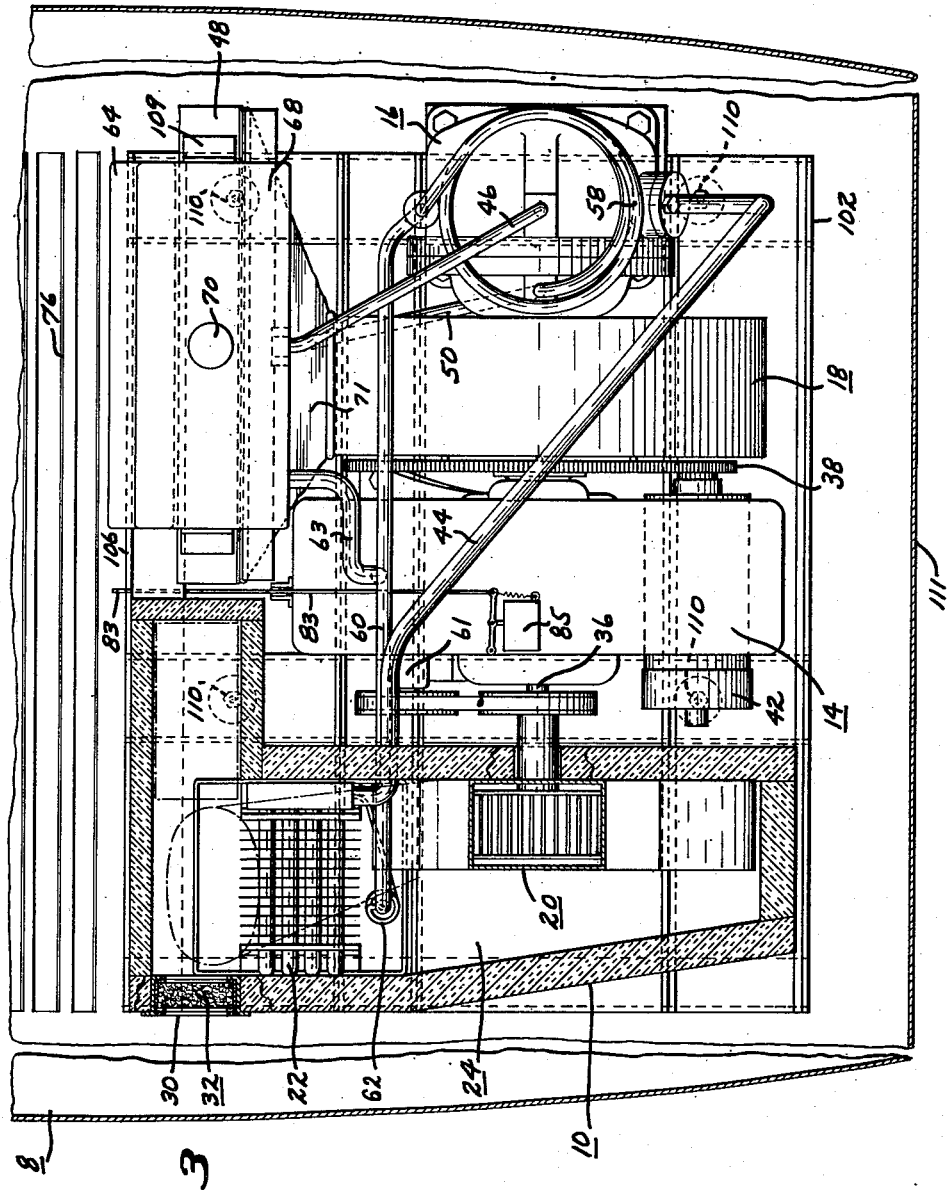

Aug. 25, 1942.  C. F. KETTERING  2,294,036
REFRIGERATING APPARATUS
Filed Dec. 29, 1938  5 Sheets-Sheet 3

INVENTOR.
Charles F. Kettering.
BY Spencer, Hardman & Hehr.
ATTORNEYS.

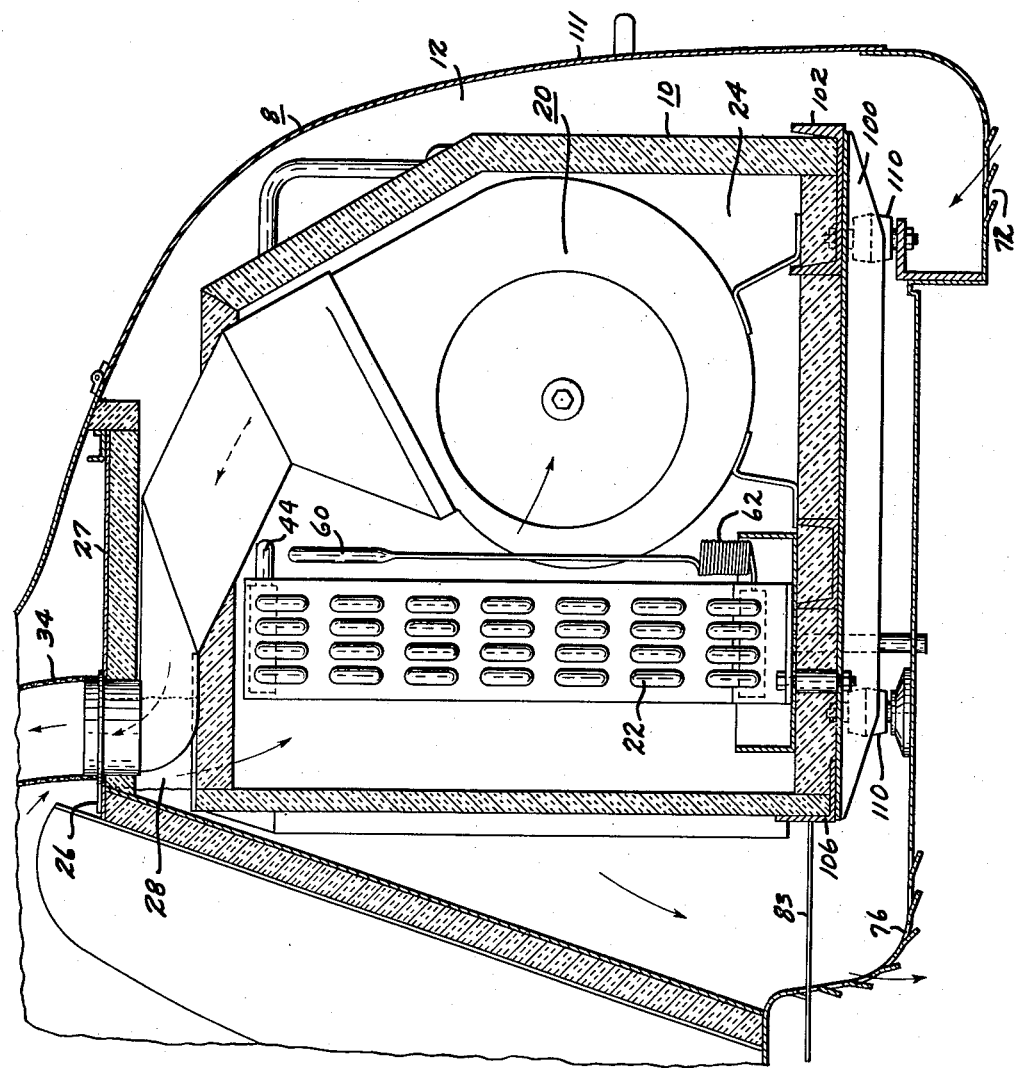

Aug. 25, 1942.  C. F. KETTERING  2,294,036
REFRIGERATING APPARATUS
Filed Dec. 29, 1938  5 Sheets-Sheet 5
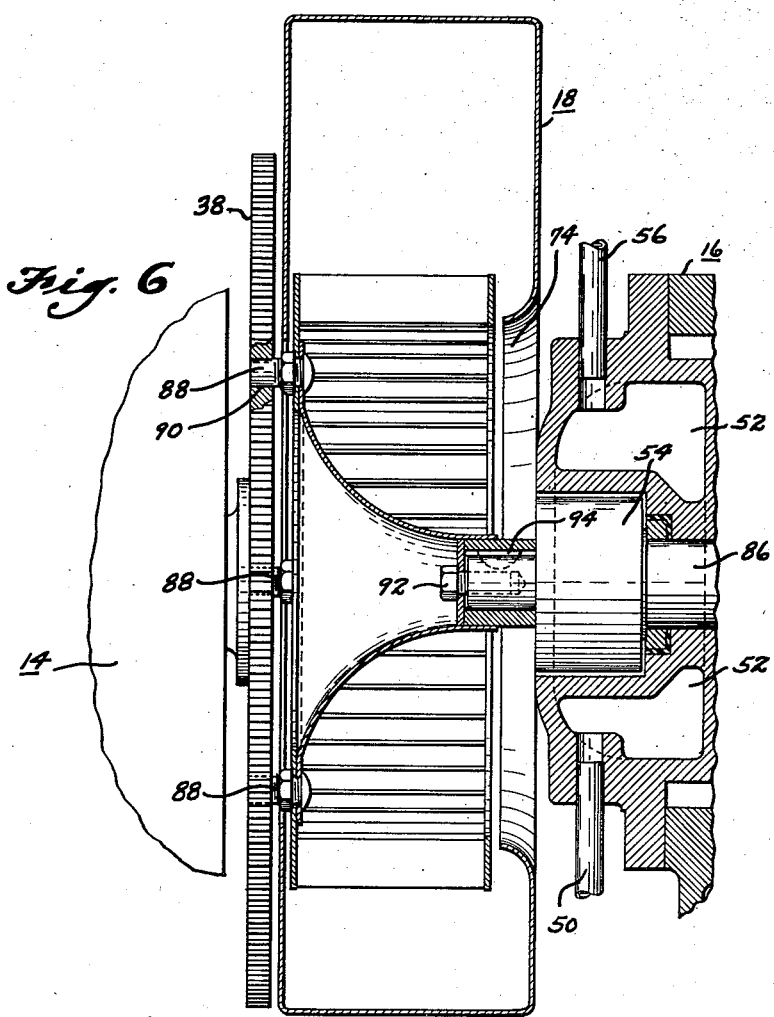
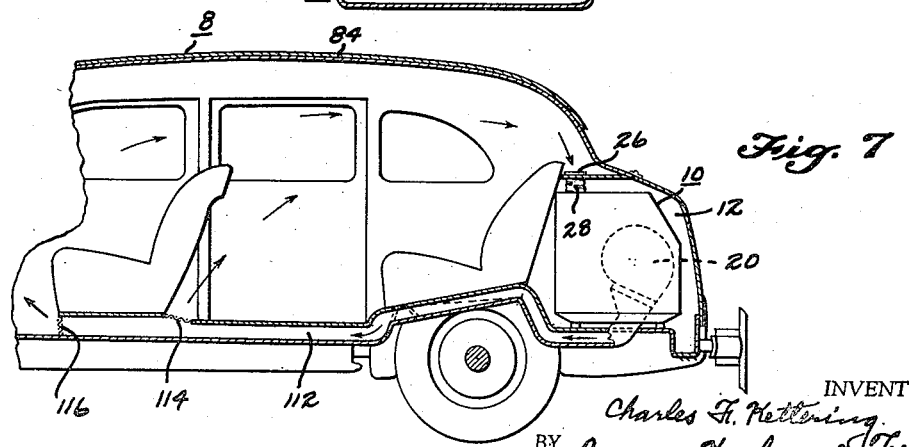
INVENTOR.
Charles F. Kettering.
BY Spencer, Hardman & Fehr.
ATTORNEYS.

Patented Aug. 25, 1942

2,294,036

UNITED STATES PATENT OFFICE 2,294,036

REFRIGERATING APPARATUS

Charles Franklin Kettering, Dayton, Ohio, assignor to General Motors Corporation, Dayton, Ohio, a corporation of Delaware Application December 29, 1938, Serial No. 248,260

8 Claims. (Cl. 62—129)

This invention relates to refrigerating apparatus and more particularly to the apparatus for and the method of conditioning air for an automobile.

One of the objects of this invention is to provide a complete air conditioning system which is removable as a unit from the automobile.

Another object of this invention is to provide a complete air conditioning unit which is of suitable size and design for mounting directly in the ordinary luggage compartment of an automobile.

Still another object of this invention is to provide an air conditioning system which is adaptable for mounting in a stock car without the necessity of making material changes in the car structure.

A further object of this invention is to provide a method and means for efficiently distributing the conditioned air within the automobile so as to avoid objectionable drafts and so as to provide uniform temperature throughout the entire passenger compartment.

Still another object of this invention is to provide a novel means for cooling the shaft seal for the compressor.

A further object of this invention is to provide special means for insulating the automobile top.

Further objects and advantages of the present invention will be apparent from the following description, reference being had to the accompanying drawings wherein a preferred form of the present invention is clearly shown.

In the drawings:

Fig. 1 is a plan view with parts broken away, showing an automobile provided with air conditioning system embodying features of my invention;

Fig. 2 is an elevational view with parts broken away of the automobile shown in Fig. 1;

Fig. 3 is a plan view partly in section, showing the conditioning apparatus mounted within the luggage compartment of a car;

Fig. 5 is an elevational view with parts broken away so as to show the arrangement within the cooling chamber;

Fig. 6 is a fragmentary view, partly broken away, showing connection between the engine and the compressor;

Fig. 7 shows a slightly modified arrangement for distributing the air within the automobile.

Figures 4, 8:
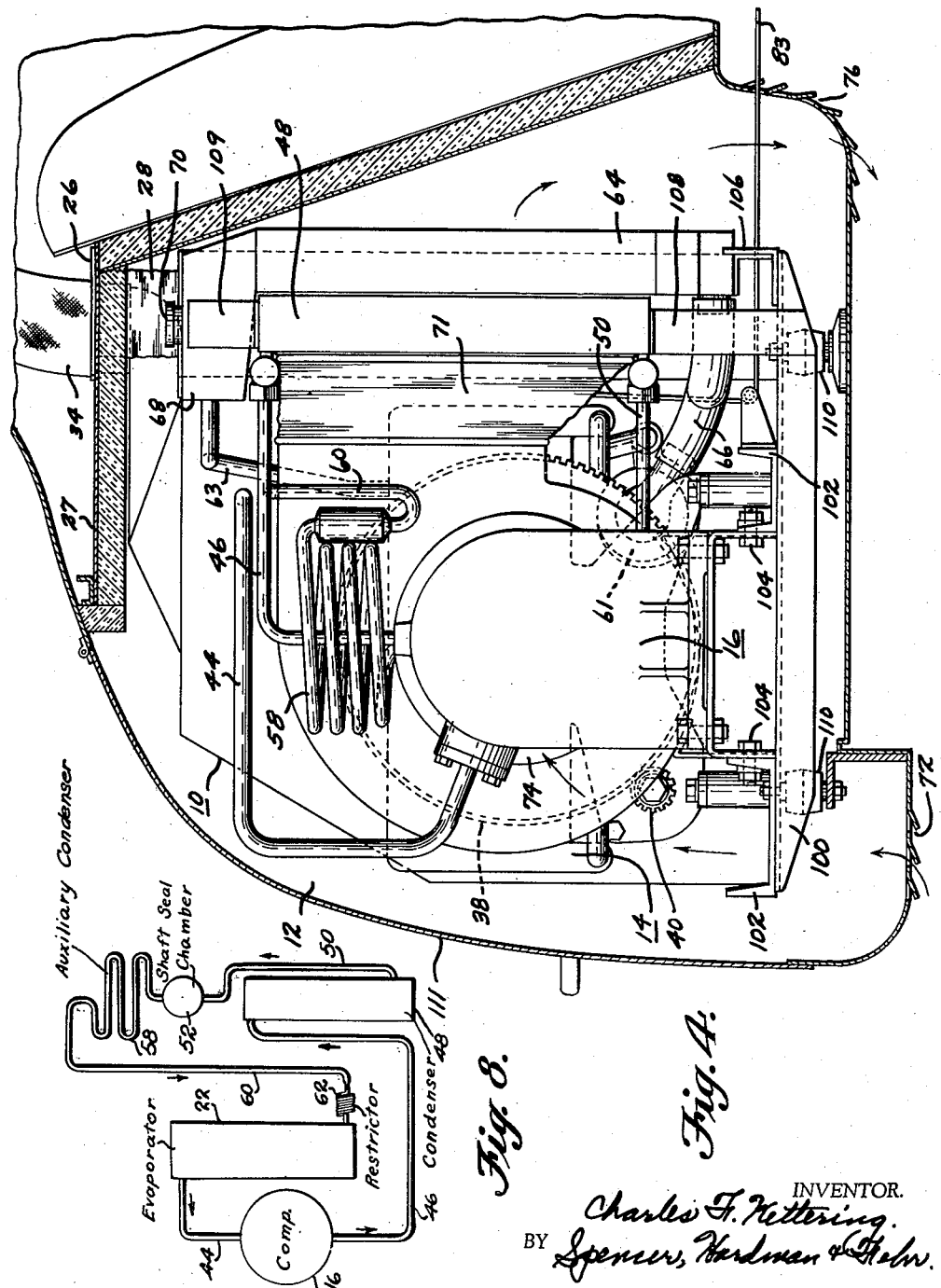
Fig. 4 is a side elevational view of the conditioning apparatus.
Fig. 8 is a diagrammatic view showing the refrigeration circuit.

In constructing conditioning apparatus for use in automobiles there are numerous problems which are not present in designing conditioning apparatus for other types of installations. Before my invention it was considered out of the question to build a compact and complete system which could be mounted as a unit in a standard stock car and which would efficiently distribute the conditioned air within the car. In accordance with my invention the conditioning apparatus may be installed in a standard car without any material alterations in the existing structure. The conditioning apparatus has been designed so as to fit within the standard luggage compartment of an automobile and so as to be removable therefrom as a package unit.

Referring now to Fig. 1, there is shown a standard automobile 8 provided with conditioning apparatus generally designated by the reference character 10 mounted within the usual luggage compartment 12. The apparatus is provided with an internal combustion engine 14 of any suitable design which is direct connected to the refrigerant compressor 16, the blower 18, which circulates air over the condenser 48, and the blower 20 which circulates air to be conditioned over the evaporator 22. The blower 20 and the evaporator 22 are mounted within an insulated compartment 24 located at the one side of the internal combustion engine 14. The return air which is to be conditioned enters the evaporator compartment through the return opening 26 (see Figs. 1 and 4) which is provided in the shelf 27 immediately behind the back seat. A flexible duct 28 (see Figs. 4 and 5) conveys the air from the opening 26 to the evaporator compartment 24. Fresh air enters the evaporator compartment through the opening 30 (see Fig. 3) which is provided with a filter 32. The air to be conditioned passes over the evaporator and is then picked up by the blower 20 which discharges the conditioned air into a duct 34, which in turn discharges the air adjacent the ceiling of the car at a point above the back seat. The conditioned air circulates along the ceiling of the car until it comes to the windshield where it is deflected downwardly into the lower portion of the front passenger compartment from whence it returns to the rear of the car, first cooling the occupants of the front seat, and thereafter cooling the occupants of the rear seat. By arranging the air inlet in a rear corner of the car adjacent the ceiling and the air outlet somewhat lower but in the same corner, more efficient circulation results.

Referring now to Fig. 3 it will be observed that the internal combustion engine 14 is placed between the rotary compressor 16 and the blower unit 20. The engine 14 has a shaft 36 which projects on both sides of the engine, the one end being connected to the blower 20 and the other end being connected to the compressor 16 through the flywheel 38 and the blower mechanism 18. The blower 18 circulates air over the condenser 48 and the engine radiator 64. The flywheel 38 is provided with gear teeth which are in mesh with teeth on the gear 40, which is carried by the starter unit 42. The starter 42 may be of any conventional design and need not be further described.

The vaporized refrigerant leaving evaporator 22 flows through the pipe line 44 which leads to the compressor. The compressed refrigerant is discharged through the line 46 which discharges the compressed refrigerant into the condenser 48. The condensed refrigerant leaves the condenser via the line 50, which conveys the liquid refrigerant to the shaft seal cooling cavity 52 (see Fig. 6) of the compressor. The purpose of this being to maintain the shaft seal 54 relatively cool. The shaft seal 54 may be of any conventional design suitable for use in a refrigerating system. After leaving the shaft seal cavity 52 the refrigerant passes through the line 56, which is provided with a plurality of coils 58 which serve to recondense any refrigerant which may have been evaporated in the shaft seal cavity 52. After leaving the coil 58 the liquefied refrigerant passes to the evaporator through the line 60 which conveys the liquefied refrigerant to the fixed restrictor 62, placed at the entrance to the evaporator 22. The engine 14 is provided with the usual form of water pump 61. The cooling water for the engine 14 is pumped from the engine through the line 63 to the engine radiator 64 where it is cooled and thereafter returns to the engine through the line 66. The radiator 64 is provided with a header 68 which projects rearwardly over the condenser 48, as best shown in Fig. 4. Water may be added to the engine radiator through the filler cap 70.

The blower 18 circulates cooling air over the condenser 48 and the radiator 64 in series. The flexible duct 71 conveys the cooling air from the blower 18 to the condenser 48, and the radiator 64. The cooling air preferably enters through the louvres 72 provided in the bottom of the luggage compartment. The air entering the louvres 72 circulates upwardly into the intake opening 74 for the fan 18, and discharges through the louvres 76 after having cooled the condenser 48 and radiator 64.

As shown in Fig. 1 the engine 14 may be started by closing the starter switch 80 located on the usual instrument panel. The speed of the engine is controlled by the throttle button 82 which is also located on the usual instrument panel. A flexible cable 83 connects the button 82 with the engine throttle 85. While I have shown a manually operated throttle it is obviously within the purview of this invention to provide thermostatic means for controlling the engine throttle.

As shown in Fig. 2 I have provided an aluminum shield 84 which serves to deflect the sun's rays and insulate the ceiling of the passenger compartment. This shield 84 may be spaced slightly from the usual car top, if desired, so as to provide an insulated air space between the shield and the top of the car. By virtue of this arrangement the conditioned air which is discharged into the passenger compartment does not become heated before it reaches the lower portion of the passenger space. As shown in Fig. 6 I have provided a novel means for transmitting the power from the engine flywheel 38 to the shaft 86 of the compressor 16. The blower element 18 is provided with a plurality of pins 88 which project into recesses 90 formed in the flywheel 38. These pins cause the blower 18 to rotate in unison with the flywheel 38. At the opposite side the blower 18 is secured to the compressor shaft by the bolt 92. With this arrangement the compressor and the blower may be separated from the engine without any special difficulty which would ordinarily result if a single shaft should extend from the compressor to the engine. After the engine has been dismantled from the blower and the compressor unit, the blower may be dismantled from the compressor unit merely by removing the bolt 92 and pulling the blower off from the compressor shaft. A key 94 is provided between the blower structure and the compressor shaft 86 which prevents relative movement between the blower and the compressor shaft when the blower is in assembled relationship with the shaft.

As pointed out hereinabove, the entire air conditioning system is readily removable from the trunk compartment as a package unit. All of the apparatus which goes to make up the package unit is supported on a common base which comprises a first pair of channel irons 100 and a second pair of channel irons 102 arranged transversely to the first pair of channel irons. The compressor 16 and engine 14 are secured to the channel irons 102 by means of bolts 104 (see Fig. 4). The radiator 64 is likewise secured to the channel irons 100 by means of the angle irons 106. The condenser 48 is supported in place by means of the bracket 108, which may be welded or otherwise secured to the base 110 and is additionally secured at its upper end to the radiator header 68 by means of brackets 109. The channel irons 100 are supported within the luggage compartment by means of the rubber mountings 110. The entire system may be removed from the luggage compartment through the door 111 without dismantling.

In Fig. 7 I have shown a slightly modified arrangement for distributing the conditioned air within the passenger compartment. As shown in Fig. 7 the conditioned air is discharged downwardly into an air duct 112 which is provided with two outlets 114 and 116. The outlet 114 is arranged to discharge a portion of the conditioned air upwardly from a point adjacent the back of the front seat. The outlet 116 is adapted to discharge air into the front portion of the car from the foot of the front seat. The location of the return air grille 26 is the same as in the first modification described. Likewise the construction of the conditioning apparatus is the same as in the first modification.

While the form of embodiment of the invention as herein disclosed, constitutes a preferred form, it is to be understood that other forms might be adopted, all coming within the scope of the claims which follow.

What is claimed is as follows:

1. In combination with a vehicle having a passenger compartment and a baggage compartment, a self-contained air conditioning system removably mounted within said baggage compartment comprising in combination, a compressor, a condenser, an evaporator, fan means for circulating air over said condenser, fan means for circulating air over said evaporator, an internal combustion engine having a shaft directly connected to said compressor and at least one of said fan means, a shaft seal for said compressor, a shaft seal cooling chamber, refrigerant flow connections between said compressor, condenser, shaft seal cooling chamber and said evaporator.

2. In combination, a compressor, a condenser, an evaporator, fan means for circulating air over said condenser, fan means for circulating air over said evaporator, an internal combustion engine for driving said compressor, a shaft seal for said compressor, a shaft seal cooling chamber, refrigerant flow connections between said compressor, condenser and evaporator, said refrigerant flow connections including means whereby liquid refrigerant is supplied to said shaft seal cooling chamber.

3. In combination, an evaporator, a condenser, compressor means for withdrawing refrigerant vapor from said evaporator and discharging the compressed refrigerant vapor into said condenser, shaft seal means for said compressor means, an internal combustion engine, power transmitting means between said engine and said compressor means, a shaft seal cooling chamber, means for conveying condensed refrigerant to said shaft seal cooling chamber, means for recondensing the refrigerant vaporized in said shaft seal cooling chamber and thereafter discharging the recondensed refrigerant into said evaporator.

4. In combination, a condenser, an evaporator, a compressor including a compressor drive shaft, a shaft seal for said drive shaft, a shaft seal cooling chamber, refrigerant flow connections between said evaporator, compressor, condenser and shaft seal cooling chamber, an auxiliary condenser, means conveying refrigerant leaving said shaft seal cooling chamber into said auxiliary condenser and thereafter into said evaporator, and means for circulating a cooling medium over said auxiliary condenser and thereafter over said first named condenser.

5. A self-contained readily removable air conditioning unit for use in combination with a vehicle having a passenger compartment and a baggage compartment at the rear of said passenger compartment comprising in combination a compressor, a compressor operating means, a condenser, an evaporator, fan means for circulating outside air over said condenser, means enclosing said evaporator and having an air inlet communicating with the upper rear portion of said passenger compartment adjacent one side thereof and an outlet for discharging air into the upper rear portion of said compartment adjacent the same side thereof, and blower means for circulating air over said evaporator and into said passenger compartment.

6. In combination, a condenser, an evaporator, a compressor including a compressor drive shaft, a shaft seal for said drive shaft, shaft seal cooling means, refrigerant flow connections between said evaporator, compressor, condenser and shaft seal cooling means, an auxiliary condenser, means conveying refrigerant leaving said shaft seal cooling means into said auxiliary condenser and thereafter into said evaporator, and means for circulating a cooling medium over said auxiliary condenser.

7. Apparatus for conditioning air for the passenger compartment of an automobile comprising in combination, a compressor, a condenser, an evaporator, means for supplying power to said compressor, air outlet means adjacent the upper rear corner of said passenger compartment, air return means adjacent said upper rear corner, and means including a fan for flowing air to be conditioned in thermal exchange with said evaporator and for discharging the air through said outlet along the ceiling of said passenger compartment to the front thereof and for withdrawing the air through the space occupied by the passengers and through said air return means.

8. In combination, a compressor, condenser means, evaporator means, means for flowing a cooling medium over said condenser means, means for flowing a fluid to be cooled in thermal exchange with said evaporator means, power means for driving said compressor, a shaft seal for said compressor, a shaft seal cooling chamber, refrigerant flow connections between said compressor, condenser means and evaporator means, said refrigerant flow connections including means whereby liquid refrigerant is supplied to said shaft seal cooling chamber at substantially condenser pressure so that the pressure within said cooling chamber substantially equals the pressure within said condenser means.

CHARLES FRANKLIN KETTERING.